Dec. 8, 1925.
S. O. THORELL
1,564,381
COMBINATION TRY SQUARE, MITER SQUARE, AND COMPASS
Filed July 26, 1923    2 Sheets-Sheet 1
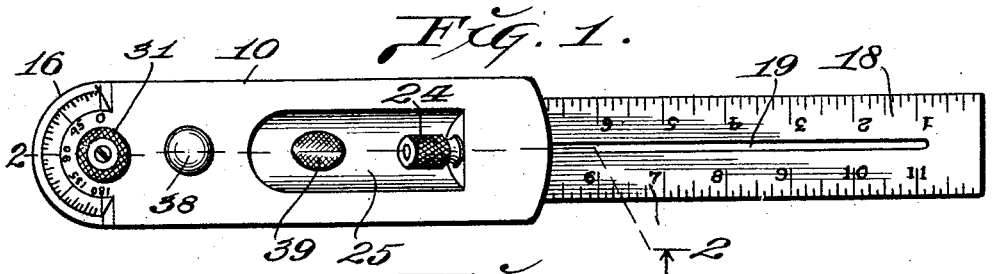
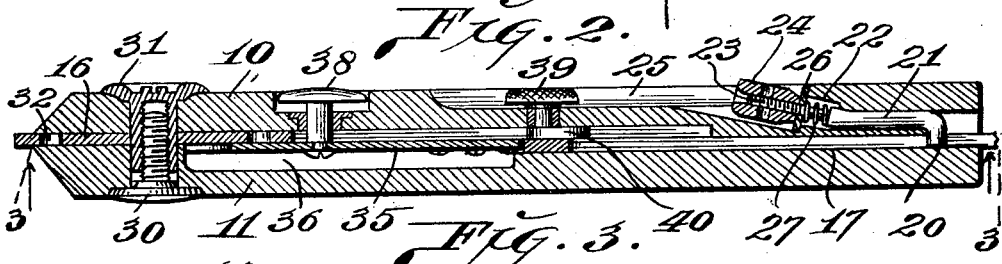
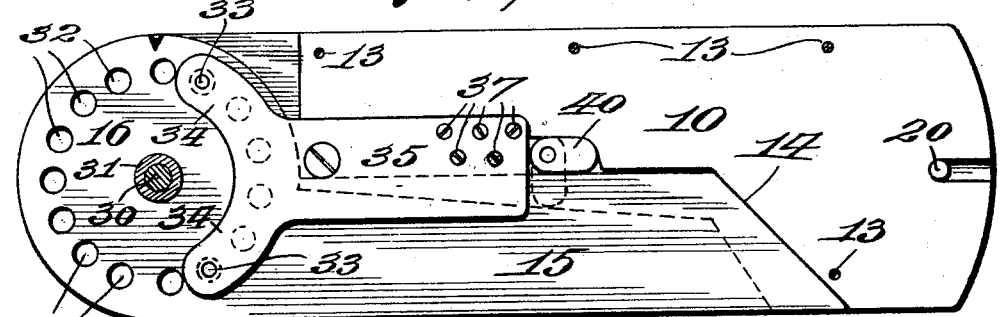
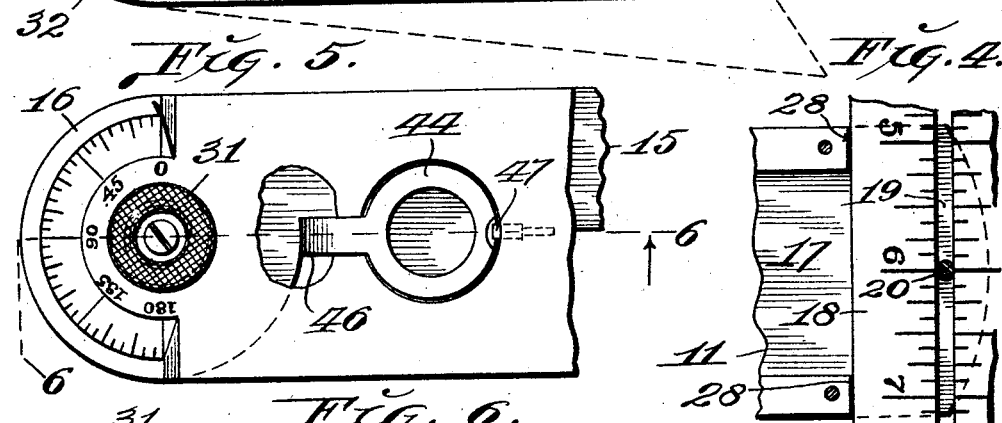
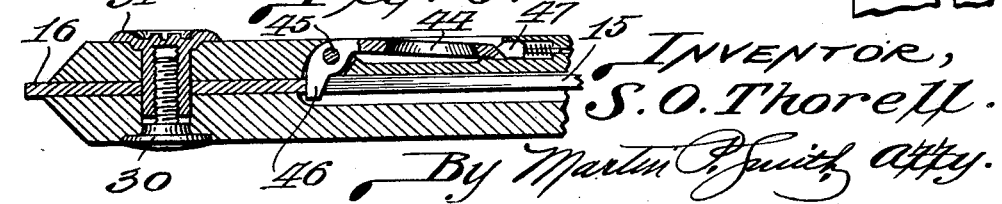

Dec. 8, 1925.  S. O. THORELL  1,564,381
COMBINATION TRY SQUARE, MITER SQUARE, AND COMPASS
Filed July 26, 1923   2 Sheets-Sheet 2
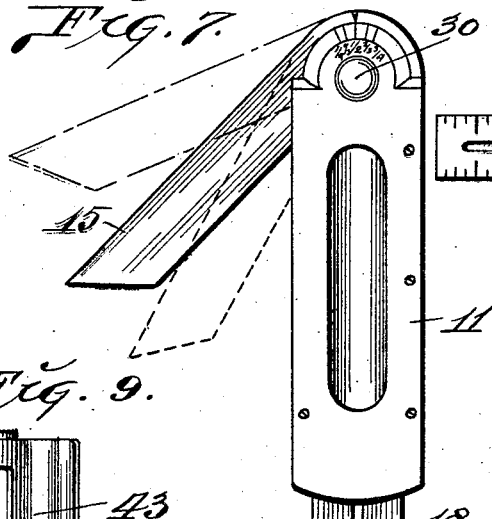
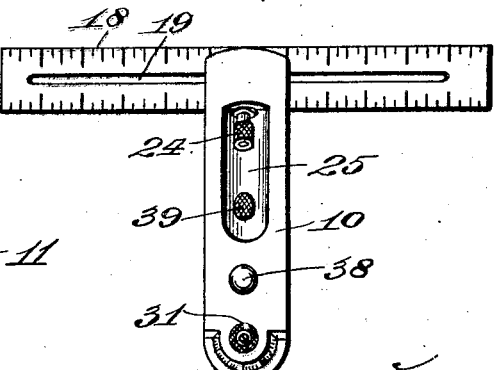
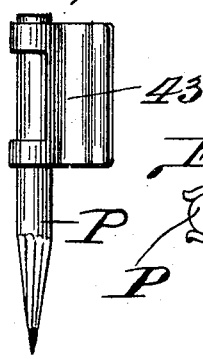
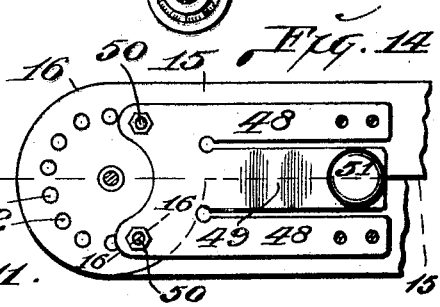
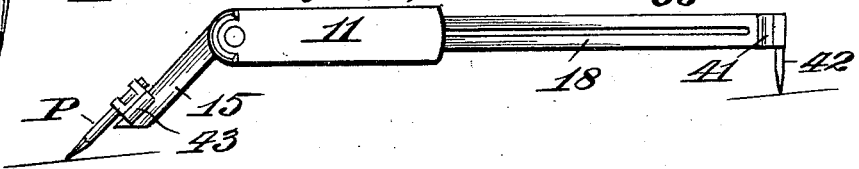
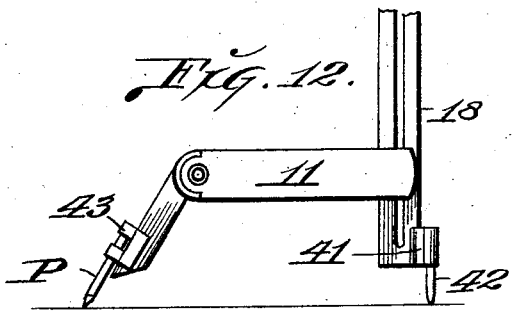
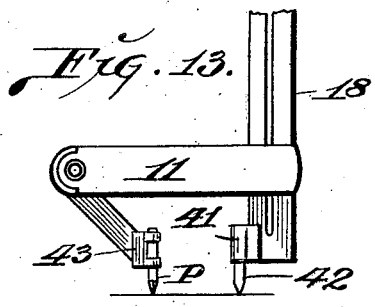
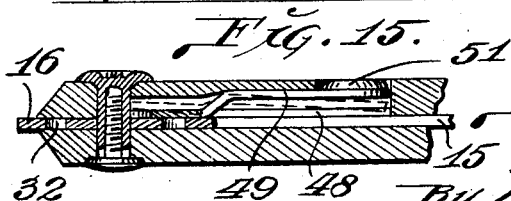
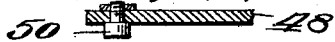
INVENTOR,
S. O. Thorell,
By Martin Smith, atty.

Patented Dec. 8, 1925.

1,564,381

UNITED STATES PATENT OFFICE.

SWAN O. THORELL, OF LOS ANGELES, CALIFORNIA.

COMBINATION TRY-SQUARE, MITER SQUARE, AND COMPASS.

Application filed July 26, 1923. Serial No. 653,873.

*To all whom it may concern:*

Be it known that I, SWAN O. THORELL, a citizen of the United States, residing at Los Angeles, in the county of Los Angeles and State of California, have invented certain new and useful Improvements in Combination Try-Squares, Miter Squares, and Compasses, of which the following is a specification.

My invention relates to a combination tool that is particularly designed for the use of persons engaged in mechanical trades and, as the tool may be manipulated and adjusted so as to function as a try square, miter square, protractor, T-square, compass, measure, straight edge, bevel, angle gage, marking gage, depth gage and height gage it is particularly applicable for use by carpenters, cabinet makers, builders and iron and steel workers.

The principal objects of my invention are, to provide a relatively simple, practical and compact tool that combines in a single structure, a number of essential tools and implements that are generally used by those engaged in building and in the wood and metal working arts; to provide a combination tool that may be readily manipulated so as to render it applicable for a specific use, and further, to provide a tool of the character described that may be easily and cheaply produced and which may be folded so as to occupy comparatively little space when packed for storage or transportation.

With the foregoing and other objects in view, my invention consists in certain novel features of construction and arrangement of parts that will be hereinafter more fully described and claimed and illustrated in the accompanying drawings, in which:

Fig. 1 is a plan view of a combination tool of my improved construction.

Fig. 2 is an enlarged section taken on the line 2—2 of Fig. 1.

Fig. 3 is a section taken on the line 3—3 of Fig. 2.

Fig. 4 is a fragmentary section showing the bearings for the measuring blade when the latter is positioned for use as a T-square or try square.

Fig. 5 is a plan view of a portion of the body of the tool and showing a modified form of lock for the miter square blade.

Fig. 6 is a section taken on the line 6—6 of Fig. 5.

Fig. 7 is a plan view of the tool set for use as a miter square.

Fig. 8 is a plan view of the tool set for use as a T-square.

Fig. 9 is an elevation view of a pencil holding clip that is applied to one of the blades of the tool when the latter is used as a compass.

Fig. 10 is a detail section showing the pencil holding clip applied to a blade.

Figs. 11, 12 and 13 are elevational views of the tool, set and adjusted for use as a compass in describing relatively large, medium and small sized circles.

Fig. 14 is a plan view showing a modified form of the lock or latching device for the miter square blade.

Fig. 15 is a section taken on the line 15—15 of Fig. 14.

Fig. 16 is an enlarged section taken on the line 16—16 of Fig. 14.

Referring by numerals to the accompanying drawings 10 and 11 designate the mating parts of the body of the tool, which parts may be formed of wood, metal, or compressed fiber and being firmly secured to each other by suitable fastening devices, such as screws or bolts 13.

The inner face of part 10 is recessed as designated by 14 to receive the miter square blade 15 and its disc like head 16 and which latter lies between the parts 10 and 11 at one end of the tool body.

The inner face of part 11 is formed with a longitudinally disposed shallow recess 17 that performs the functions of a pocket to receive a portion of the try and T-sqaure blade 18 while the latter is not in use.

This blade is preferably formed of metal and appearing on its upper face adjacent to its edges are graduated scales that are preferably divided into inches and the divisions thereof and properly marked. Thus both edges of the blade may serve as a measure and as a straight edge.

Extending lengthwise in the center of the blade is a slot 19 and passing through the latter is a stud or hook 20 that is formed on the end of a blade-retaining and locking bolt 21.

This bolt is arranged for sliding movement in an aperture 22 that is formed in the inner face of member 10, near one end, and the end of said bolt opposite to the end that is provided with the stud is reduced in diameter and threaded as designated by 23 in order to receive a nut 24.

This nut 24 occupies the end portion of a recess 25 that is formed in the outer face of member 10 and the inner end of the aperture 22 communicates directly with this recess.

Nut 24 bears against the end of recess 25 or against a bearing washer 26 and interposed between said washer and the shoulder at the inner end of the reduced portion 23 of bolt 21 is a compression spring 27.

When the nut 24 is unscrewed spring 27 will force bolt 21 outwardly through aperture 22 thereby releasing stud 20 from its bearing against the edge of blade 18 adjacent to slot 19, and as a result said blade may be moved lengthwise between the ends of members 10 and 11 until said stud occupies a position at the end of said slot, whereupon the blade may be swung around into alignment with the body of the tool and then moved for a part of its length into the pocket or recess 17.

When the blade 18 is drawn out, and moved into position to form a try or T-square, its inner edge bears against shoulders 28, that are formed on member 11, to the sides of pocket or recess 17, (see Fig. 4).

When the blade is thus positioned it may be firmly clamped to the tool body by screwing nut 24 so as to draw in the bolt 21 and as this is done, stud 20 will act to clamp the inner edge of the blade firmly against the shoulders 28.

The head 16 of blade 15 is pivotally mounted upon a bearing that comprises a flat headed bolt 30 that is seated in member 11 and a tubular nut 31, that is seated in member 10 and which engages said bolt.

Formed in the disc head 16 is a concentric row of apertures 32 that are properly spaced apart and, for the purpose of locking the head and its blade in an adjusted position, a widely separated pair of the apertures 32 receive studs 33 that project upwardly from diverging arms 34 and which latter are formed on one end of a spring plate 35.

This plate underlies a portion of blade 15 and its head 16 and it occupies a recess 36 that is formed in the inner face of member 11, at the inner end of pocket or recess 17.

The rear end of this plate is secured to the under face of member 10 by screws 37.

A push button 38 that is mounted for operation in member 10 has its inner end connected to spring plate 35 and when this button is pushed inwardly the forward portion of said plate is sprung downward so as to disengage the studs 33 from the apertures in which they have been seated and thus the blade 15 may be swung upon its pivot to the desired angular position.

Apertures 32 are spaced so that blade 15 may be adjusted to a number of definite angles and if it is desired to adjust and set the blade at an angle between these definite or predetermined angles and which are governed by the apertures 32, the locking studs are disengaged from the apertures in head 16 by pressing in button 38, after which, the blade is adjusted to the desired position and then locked by tightening nut 31 on bolt 30 to clamp the head 16 between the ends of body members 10 and 11.

Journalled in a bearing in member 10 is a turn button 39 that carries on its inner end, a finger 40 that bears against the inner edge of blade 15. This turn button and finger are used for swinging blade 15 a short distance out from the tool body when it is desired to adjust and set the miter square blade. (See dotted lines Fig. 3.)

The end of body member 10 that covers the disc head 16 of blade 15 is formed on a semicircle and bevelled and arranged on the bevelled face are graduated and numbered marks to represent the degrees of a semicircle.

A point or arrowhead on the face of head 16 near its edge co-operates with the marks of the graduated scale in determining the angularly adjusted position of the blade 15.

The corresponding end of body member 11 is made in the form of a semicircle and bevelled and, appearing on this bevelled face are marks that represent the different standard roof pitches and a point or arrowhead on the adjacent edge of the head enables the blade 15 to be adjusted and set so as to accurately obtain any desired roof pitch (see Fig. 7).

To use the tool as a compass for describing relatively large, medium or small sized circles, the body and blades are adjusted into the positions as illustrated in Figs. 11, 12 and 13 respectively and a spring clip 41, carrying a point 42 is detachably arranged on the end of blade 18 and a similar clip 43 as illustrated in Figs. 9 and 10 and which carries a pencil P is detachably applied to the end of blade 15.

In Figs. 5 and 6, I have shown a modified form of the latch or holding means of the miter blade head 16 and this arrangement includes a lever-like member 44 that is fulcrumed on a pivot pin 45 in member 10 and depending from said member adjacent to its pivot point is a finger 46 that is adapted to bear against the edge of the blade head and by friction, hold said head and blade in their set positions.

When member 44 is pressed down into restraining position, it is engaged and retained in such position by a spring held finger or detent 47.

In Figs. 14 and 15 I have shown a further modified form of the miter blade head latching means and in this arrangement, a flat piece of resilient metal is slotted lengthwise to form a pair of side spring arms 48 and an intermediate arm 49 that performs the functions of an operating lever.

This plate occupies a recess in member 10 above blade 15 with the forward end of said plate overlying the head of the blade.

Seated in the forward corners of the plate are studs 50 that are adapted to enter apertures in the blade head.

The intermediate portion of lever arm 49 is bent upward and carried by the rear end of said arm, is a push button 51 that occupies an aperture in member 10.

Under normal conditions the forward portion of the plate lies directly on top of head 16 with the studs 50 in a pair of the apertures in said head but when the rear portion of lever arm 49 is depressed by pushing in button 51 the forward portion of the plate will swing upward thereby disengaging studs 50 from the apertures and consequently enabling the miter blade to be swung into the desired position.

Thus it will be seen that I have provided, in a relatively simple and compact structure, readily operable and adjustable parts, that may be manipulated to form various tools that are frequently used by carpenters, builders, cabinet makers and the like.

Obviously the details of construction of my improved combination tool may be varied slightly in form, size and arrangement, without departing from the spirit of my invention, the scope of which is set forth in the appended claims.

I claim as my invention:

1. In a combination tool, a body having a centrally arranged longitudinally disposed pocket, there being a transverse slot at one end of said body, which slot intersects said pocket, transverse shoulders formed at the inner side of the slot to the sides of said pocket and a try square blade pivotally and slidably connected to said body and occupying the slot therein, with the inner edge of said blade normally bearing against said shoulders and which blade, while not in use occupies the pocket in said body.

2. In a combination tool, a body having a centrally arranged longitudinally disposed pocket, there being a transverse slot at one end of said body, which slot intersects said pocket, transverse shoulders formed at the inner side of the slot to the sides of said pocket, a try square blade pivotally and slidably connected to said body and occupying the slot therein, with the inner edge of said blade normally bearing against said shoulders, which blade, while not in use occupies the pocket in said body, and means for locking said blade to the body in various adjusted positions.

3. In a combination tool, a body having a centrally arranged longitudinally disposed pocket, one end of said body having a transversely disposed slot that intersects said pocket, shoulders formed at the inner edge of said slot to the sides of the outer end of said pocket, a try square blade arranged for sliding movement through said slot with the inner edge of said blade bearing against said shoulders, which blade, while not in use occupies said pocket, said blade having a longitudinally disposed centrally arranged slot and a latching member adjustably seated in the body and having a portion that projects through the slot in the blade to form a bearing and pivot for said blade while the same is being adjusted on said body.

4. In a combination tool, a body provided in one of its sides with a longitudinally disposed slot, a miter blade having a head that is pivotally mounted in the outer end of said slot, said head having a circular row of apertures that are concentrically arranged with respect to the pivot of said head, a spring plate secured to said body within the slot therein and having a portion that overlies the perforated portion of said head and spaced lugs on the overlying portion of said plate for engaging the perforations in the head of the blade to lock the latter in various angular position.

5. In a combination tool, a body provided in one of its sides with a longitudinally disposed slot, a miter blade having a head that is pivotally mounted in the outer end of said slot, said head having a circular row of apertures that are concentrically arranged with respect to the pivot of said head, a spring plate secured to said body within the slot therein and having a portion that overlies the perforated portion of said head, spaced lugs on the overlying portion of said plate for engaging the perforations in the head of the blade to lock the latter in various angular positions and a push button arranged in the body for actuating the spring plate to disengage the spaced lugs from the perforations in said head.

6. In a combination tool, a body having a longitudinally disposed pocket, a slotted blade arranged for sliding movement on one end of said body and adapted to enter said pocket both ends of said blade being square so as to lie flush with the side faces of the body when the tool is adjusted as a right hand or left hand try square, and an adjustable bolt seated in said body and having a stud on one end that engages in the slot in said blade and forms a pivot therefor.

7. In a combination tool, a body, a miter blade pivotally mounted on one end thereof; a manually operable spring latch arranged within a recess in said body for holding the blade in different adjusted positions, a measuring blade mounted for sliding and pivotal movement on the opposite end of said body and means for clamping said last mentioned blade to said body in different adjusted positions, said body having a centrally arranged pocket that is adapted to receive the measuring blade while the same is not in service and measuring blade bearing shoulders formed on the body to the sides of the pocket therein.

8. In a combination tool, a body having a centrally disposed longitudinally extending pocket, a try square blade for sliding and pivotal movement at one end of said body and adapted to occupy said pocket while not in use, said body being provided at its opposite end with a slot that extends along one side of said body, a miter blade pivotally connected to the slotted end of the body and adapted to occupy the slot in the side thereof while not in use and means for locking said miter blade to said body in different adjusted positions.

In testimony whereof I affix my signature.

SWAN O. THORELL.